United States Patent [19]

Adell

[11] Patent Number: 4,587,761
[45] Date of Patent: May 13, 1986

[54] DOOR EDGE GUARD AND METHOD FOR DE-EMPHASIZING THE GAP BETWEEN A DOOR EDGE AND ADJACENT STRUCTURE

[75] Inventor: Robert Adell, Sunnyvale, Tex.

[73] Assignee: U.S. Product Development Company, Sunnyvale, Tex.

[21] Appl. No.: 604,186

[22] Filed: Apr. 26, 1984

[51] Int. Cl.⁴ .............................................. B60J 5/00
[52] U.S. Cl. ......................................... 49/462; 52/716
[58] Field of Search ................ 49/462, 482, 488, 380, 49/506; 52/716, 717

[56] References Cited

U.S. PATENT DOCUMENTS

| | | | |
|---|---|---|---|
| 2,879,104 | 3/1959 | Halladay | 49/462 |
| 3,401,486 | 9/1968 | Adell | 49/462 |
| 3,593,458 | 7/1971 | Wahlfeld et al. | 49/380 |
| 3,618,261 | 11/1971 | Torbett | 49/380 |
| 4,334,700 | 6/1982 | Adell | 49/462 X |
| 4,365,450 | 12/1982 | Adell | 52/716 X |
| 4,372,083 | 2/1983 | Hatzikelis et al. | 49/462 |
| 4,379,377 | 4/1983 | Adell | 49/462 |

Primary Examiner—Philip C. Kannan
Attorney, Agent, or Firm—Stephenson & Boller

[57] ABSTRACT

An edge guard and method whereby the edge guard is used to substantially fill the gap between the trailing edge of a door onto which the edge guard is installed and an adjacent portion of the vehicle body. In the case of a two-door model car and the rear door of a four-door model car the adjacent body structure is a pillar or post. In the case of the front door of a four-door model the adjacent body structure may be the front edge of the rear door. When the rear door swing is such that its front edge swings slightly forwardly when the door is opened, provision is made so that the front edge of the rear door does not hit the edge guard on the front door. The edge guard is characterized by inner and outer legs of substantially longer length than other edge guards whereby the edge guard may have a variable engagement with the door edge to permit adjustment for a range of different thicknesses of gap. A hardenable filler material is introduced during installation of an edge guard and is pliable at this stage to permit the edge guard to be adjusted. It subsequently sets to a hardened condition to provide a substantially permanent locator for the adjusted door edge guard. The edge guard is enclosed with protective insulation whose color matches that of the door and adjacent body structure whereby both the edge guard and the gap are substantially de-emphasized thereby promoting sleekness in the appearance of the automobile.

15 Claims, 10 Drawing Figures

DOOR EDGE GUARD AND METHOD FOR DE-EMPHASIZING THE GAP BETWEEN A DOOR EDGE AND ADJACENT STRUCTURE

BACKGROUND AND SUMMARY OF THE INVENTION

This invention relates generally to edge guards of the type which are applied to swinging closures in automotive vehicles. More specifically, it relates to an improved edge guard and method for de-emphasizing the gap which exists between the door edge onto which the edge guard is installed and an adjacent portion of the vehicle body.

In the case of an automobile door, it is desirable to install an edge guard along the trailing edge thereof. The edge guard provides both decorative and protective functions. In regard to the protective function it is the purpose of the door edge guard to prevent the door edge from being damaged when the door is swung open against an object in the path of travel of the swinging door. Without door edge guards the painted door edges are subject to chipping, marring, and consequent adverse effects such as rusting and corrosion. This leads to unsightly appearance detracting from the value of the vehicle.

Applicant's efforts in the field of door edge guards are documented by a number of issued and pending United States patents. One important improvement invented by applicant comprises an insulated edge guard in which an insulating material, such as a plastic for example, is applied to a metal edge guard channel. The plastic serves to protectively insulate the metal of the edge guard channel from the metal of the door. In so doing it minimizes the possibility of electro-chemical action occurring between the two metals. Such electro-chemical action gives rise to deterioration, rusting, etc., and is undesirable.

Applicant has also pointed out the advantage of having self-retaining edge guards. For certain usages self-retention is a desirable attribute in an edge guard because it means that no additional procedures are required in order to install an edge guard on a door. Moreover it does not require the use of additional attaching parts, fasteners, or adhesives. A self-retaining metal edge guard applies the self-retention force via the legs of the metal U-shaped channel which bear against opposite sides of the door edge on which the edge guard is installed. One of applicant's inventions relates to the provision of insulating material (i.e. plastic, and or rubber, and/or any other insulating material presently or hereafter known) between the points at which the self-retention force is applied.

Other of applicant's inventions relate to the use of plastic or other insulating material on the exterior and/or interior or any combination thereof on the U-shaped channel.

Reference is made to the following issued patents of applicant:

| | | |
|---|---|---|
| 4,259,812 | 4,365,350 | 4,387,125 |
| 4,316,348 | 4,377,056 | 4,429,013 |
| 4,334,700 | 4,379,376 | 4,434,598 |
| 4,338,148 | 4,379,377 | |

There are also a number of pending patent applications relating to Door Edge Guards which are known to the Patent Office by virtue of their pendency.

The present invention relates to a new and unique edge guard and method whereby the gap which exists between the edge on which the edge guard is installed and an adjacent portion of the vehicle body is de-emphasized.

For certain automobile designs, it is desirable to impart a sleek appearance, such as for example having character lines extend from front to rear along the sides of the vehicle. The installation of a door edge guard on the trailing edge of a door will generally be transverse to the direction of desired sleekness. The adjacent gap between the trailing edge of the door and the adjacent portion of the vehicle body will also be generally transverse to the direction of sleekness.

In order to de-emphasize the gap between the trailing edge of the door and the adjacent portion of the vehicle body, very extensive body panel fit improvement programs have been adopted by automobile manufacturers. Unfortunately in at least one instance the attempt to minimize the gap has resulted in the inability of the door edge to accept a door edge guard. Door edge guards are typically accessory or option items, and therefore if a car door is designed with an improved fit to the door frame opening, it becomes impossible to offer door edge guards as an accessory or option because there is too little room. Not only does this deprive the consumer of the protective attributes which door edge guards can afford but it also deprives the automobile manufacturers and dealer organizations of the additional profit which is gained when edge guards are sold as an option or accessory.

The present invention is directed to an edge guard and method which addresses concerns about body panel fit, yet permits a car to be equipped with door edge guards. The invention permits an automobile to have the benefit of door edge guards while at the same time de-emphasizing the gap between the door edge and the adjacent part of the vehicle body. Moreover, the invention can even de-emphasize, at least from the appearance standpoint, even the presence of an edge guard itself.

Hence, when the present invention is applied to an automobile door, both the effect of the edge guard and the adjacent gap between the door edge and the vehicle body are de-emphasized. This is deemed from the styling standpoint to promote a sleeker appearance.

Another advantage of the invention is that it is readily adaptable to accommodate tolerance variations in the gap itself without impairing the effectiveness of the edge guard in performing its protective function or impairing the ease of installation of the edge guard.

The foregoing features, advantages and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

DESCRIPTION OF THE PREFERRED EMBODIMENT

Figure 1:
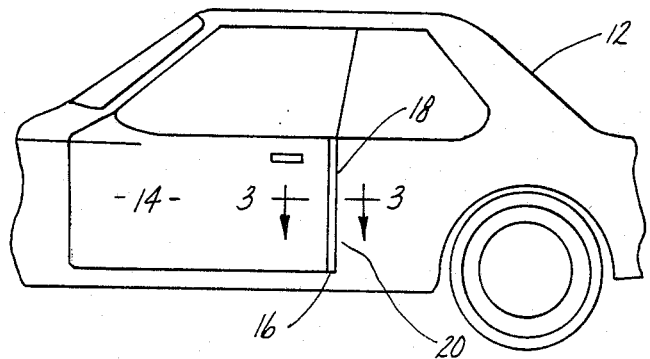
FIG. 1 is a fragmentary side elevational view of a two-door automobile containing a door edge guard according to the present invention.

FIG. 1 illustrates a two-door automobile 12 to which door edge guards 13 embodying principles of the present invention have been applied. The vehicle comprises side doors 14 having trailing edges on which edge guards 16 are installed. When door 14 is in the closed position, as illustrated in FIG. 1, the edge guard 16 is disposed at the gap 18 between the door's trailing edge and the matching forward edge of the vehicle body. In this case the forward edge of the vehicle body is part of the vehicle quarter panel and identified by reference numeral 20.

Figure 2:
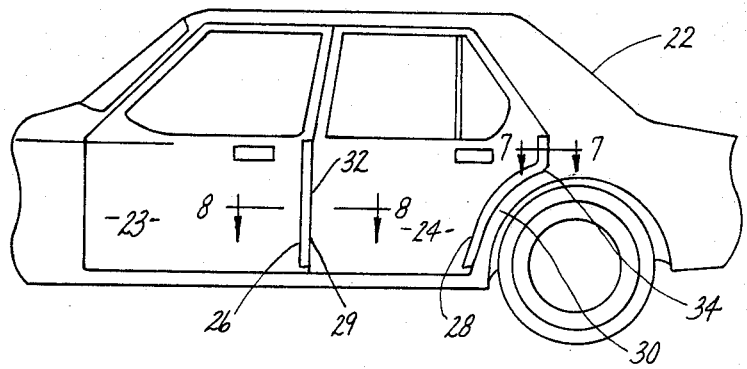
FIG. 2 is a side elevational view of a four-door automobile containing door edge guards according to the present invention.

FIG. 2 illustrates a four-door vehicle 22 having on each side front and rear doors 23, 24 respectively. An edge guard 26 is installed on the trailing edge of front door 23 and an edge guard 28 on the trailing edge of rear door 24. In this instance, the adjacent part of the vehicle body adjacent to the front edge guard 26 is the forward edge 29 of rear door 24. The forward edge 30 of the rear quarter panel matches the trailing edge of the rear door 24. The gaps associated with the respective edge guards are identified by the reference numerals 32 and 34.

Figure 3:
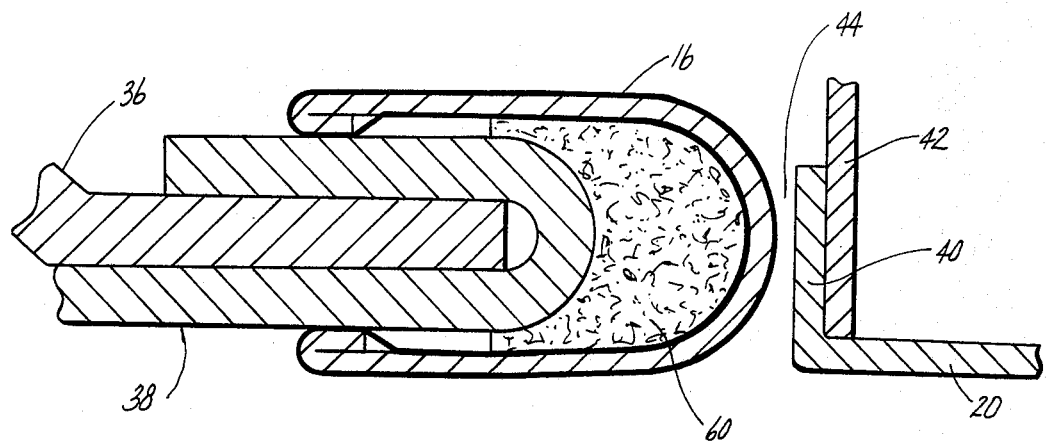
FIG. 3 is an enlarged horizontal cross sectional view taken in the direction of arrows 3—3 in FIG. 1.

FIG. 3 illustrates further details of the construction of edge guard 16 and its association with the automobile. Door 14 comprises a typical construction used in the automotive industry wherein the door is constructed of an inner door panel 36 and an outer door panel 38. The two door panels join together around their perimeters by means of a welded hem flange wherein the outer perimeter margin of the outer door panel 38 is wrapped around the outer perimeter margin of the inner door panel 36 as depicted by FIG. 3.

The adjacent portion of the body comprises the quarter panel having a flange 40 disposed against a pillar or post 42. This is also a representative automobile construction.

FIG. 3 illustrates door 14 in the closed position. It will be observed that edge guard 16 fits onto the trailing edge of door 14 and substantially fills gap 18. There is however a very slight clearance 44 which is provided so that the edge guard does not in fact contact either quarter panel flange 40 or pillar 42.

Figure 4:
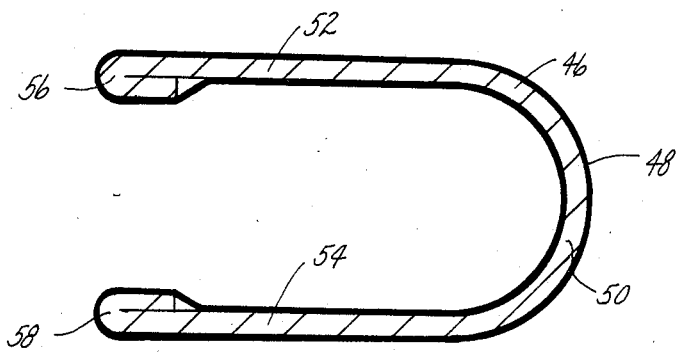
FIG. 4 is a view similar to FIG. 3 illustrating the edge guard by itself.
Figure 5:
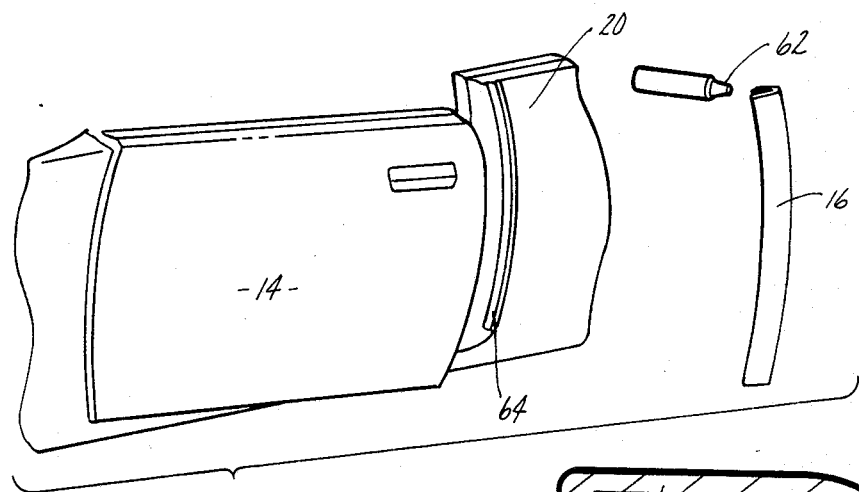
FIG. 5 is a perspective view illustrating a method of installing the edge guard according to the present invention.

The detailed construction of edge guard 16 is shown in FIG. 4. The edge guard comprises a metal U-shaped channel 46 which is covered, except at its longitudinal ends, by a plastic encapsulation 48. The illustrated shape and construction of edge guard 16 depicted in FIG. 4 is intended to be merely representative. The illustrated construction comprises the metal channel 46 having a general U-shape composed of a curved base 50, an inner leg 52 and an outer leg 54, each of which legs projects from a corresponding end of base 50 as viewed in cross section. The distal end of each leg 52, 54 is provided with a bead 56, 58 respectively, with the illustrated beading comprising the distal margins of the legs being reverse turned inwardly back onto themselves.

The illustrated edge guard is advantageous in that it is a self-retaining type wherein the metal channel 50 provides the self-retention force with the beads 56, 58 bearing against the door edge on opposite sides through the protective insulation.

It will be observed that although the edge guard possesses a generally U-shaped cross section, the proportions are different from those of other edge guards. Specifically, the lengths of the legs as viewed in FIG. 4 are considerably greater in relation to the radius of base 50 than is the case with other edge guards. As will become apparent, this is of particular significance.

The protective insulation 48 is shown to cover both the interior of the U-shaped cross section as well as the exterior. Once again, this particular illustration of insulating material is representative. It is desirable to fully cover the entire interior with insulation as shown to protectively insulate the metal of the channel from the metal of the door edge. Moreover, in accordance with a certain aspect of the present invention it is important to cover the exterior of the metal channel with insulation from an appearance standpoint, particularly that portion of the edge guard which is visible from the side of the vehicle when the door is closed.

The illustrated full covering of both interior and exterior of the cross section is desirable from a manufacturing standpoint since it is possible for the material to be extruded or co-extruded onto the metal either before or after forming of the metal to the U-shaped cross section. Other means are also possible to apply the insulation such as by dipping, or by lamination of plastic film.

As explained in reference to FIG. 3 edge guard 16 is installed on the trailing edge of door 14 such that the edge guard fills substantially all of the gap 18 which would otherwise exist between the trailing edge of the door and the adjacent structure 40, 42. A significant advantage of the invention is that a given edge guard cross section design can be fitted onto a door edge and still substantially fill gap 18 despite variations in the dimension of gap 18 from vehicle to vehicle. In other words the edge guard can be mass produced to a given design and when it is installed on any given vehicle it can be adjusted on the edge so as to substantially fill the gap 18 for any gap dimension within a range of tolerances. As can be appreciated from consideration of FIG. 3 the lengths of the legs 52 and 54 are such that there is a substantial amount of overlap with the trailing edge of the door. Hence, the extent to which the edge guard is fitted onto the door edge may be set as desired by either more or less fully inserting the edge guard onto the door edge so as to yield a certain minimum spacing 44 depending upon the extent to which the edge guard is engaged with the door edge. It is desirable to avoid direct contact between the edge guard and the adjacent pillar and post construction 40, 42 so that the possibility of repeated opening and closing of the door wearing away the insulation on the outside of the edge guard is foreclosed.

Because of the self-retaining character of the edge guard and the variable extent to which the legs may be fitted onto the door edge, the invention further provides a means to set the edge guard on the door edge such that the proper extent of door edge engagement is assured and maintained during and after the initial installation. This is accomplished by means of a filler 60 disposed within the interior of the U-shaped edge guard as appears in FIG. 4. The filler material 60 is any suitable material which will be effective to maintain the relative position of the edge guard in relation to the door edge once the proper installation adjustment has been made. For example, the filler material 60 may comprise a material which is applied to the channel's interior prior to installation of the edge guard channel on the door edge. When the edge guard is fitted onto the door edge, the material comes between the door edge and the edge guard. It remains pliable long enough to allow the proper adjustment of the edge guard on the door edge to be made, and it thereafter sets to a hardened state. In the hardened state, it becomes impossible to push the edge guard more fully onto the door edge. It is possible that the material could have resilient and/or characteristics whereby a certain resiliency is imparted but providing a memory whereby even if the edge guard is displaced on the door edge, it will return to the proper adjusted position.

Figure 6:
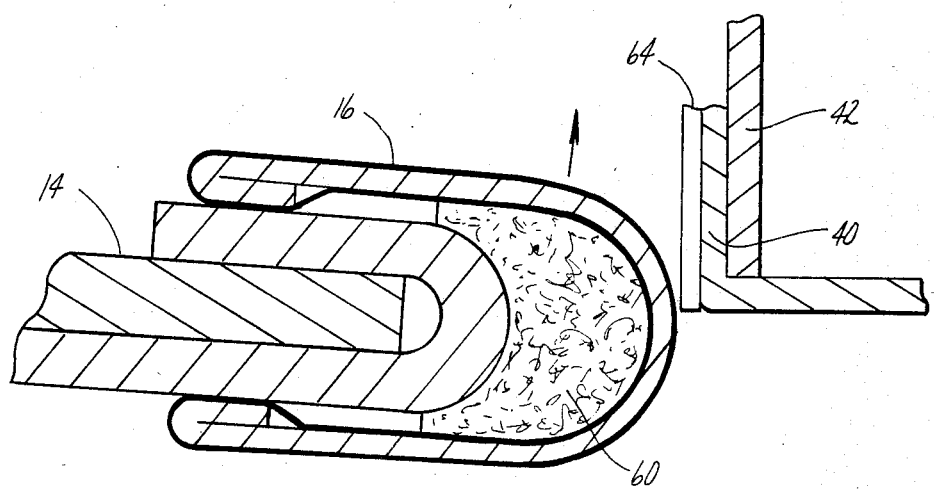
FIG. 6 is a cross sectional view taken horizontally and illustrating a particular step in the method.

FIG. 6 illustrates an exemplary application of the method. The filler material 60 is dispensed into the interior of the channel by any suitable means such as a nozzle 62. Means may be provided to control the application so that a substantially proper amount is always applied to the edge guard channel. The channel is then fitted onto the door edge.

In order to provide the installation procedure with a means to achieve the desired gap thickness 44, it is useful to include a shim in the installation procedure. Such a shim 64 is shown in FIG. 6 as applied onto flange 40 of the quarter panel. With the edge guard having been installed approximately onto the door edge while the door is open, the door may be moved toward its closed position. As the door is brought to the closed position the edge guard may be relatively adjusted on the edge so as to just bring the edge guard into contact with the shim as the door closes. Once this contact has been achieved throughout the length of the edge guard, the edge guard is deemed to be in the proper installed position.

Thereafter, the door is opened and the shim is removed from the quarter panel flange. Now when the door is again closed the minimum thickness gap 44 exists between the edge guard and the adjacent body structure whereby the desired objectives of non-contact and minimum gap width between the edge guard and the pillar or quarter panel are achieved. In the event that there is an excess of filler material between the edge guard and the door edge, it is permissible for some of it to intrude between the legs of the edge guard and the opposite sides of the door edge. If there is any material which escapes the edges it may be wiped away. Similarly any material which passes out of the longitudinal ends of the edge guard may also be removed. It is preferable however to control the application in such a manner that the possibility of excess filler material leaking out does not occur. This can be done by selectively applying the filler material to the edge guard; for example, by not applying a continuous length of the filler throughout the entire length of the edge guard channel, but rather at selected points along the length.

The thickness of the shim 64 is used to set the width of gap 44. The shim may be any suitable material such as a strippable adhesive tape applied to the quarter panel flange. It also could be a separate fixture which is positioned against the quarter panel flange during the installation procedure and which is subsequently removed after the proper adjustment of the edge guard on the door edge has been obtained. Still another possibility for the shim will be seen in the ensuing description of a later drawing figure.

On the basis of the foregoing description, it can be appreciated that the invention has yielded an edge guard construction wherein the gap which would otherwise exist between the trailing edge of the door and the adjacent portion of the vehicle body has been substantially filled by the door edge guard. The door edge guard itself is further constructed so as to de-emphasize not only the gap but the edge guard itself. This is accomplished by the selective coloration of the edge guard to match the color of the exterior of the car door and adjacent quarter panel. The selective coloration comprises the plastic material on the exterior of the edge guard channel being colored to match the paint of the door and quarter panel. In this way when the edge guard is installed on the door edge the edge guard will be essentially unnoticeable when viewed from the side of the car, and at the same time because it is concealing the gap, it greatly attenuates the effect of the gap on the car's appearance. Therefore, the sleekness of the vehicle is enhanced because there is less noticeable interruption of any fore and aft extending character lines which may be present in the car's design. Functionally the edge guard serves to provide protection for the painted door edge in the same manner as provided by applicant's other edge guards.

The protective function protects against paint chipping and marring on the underlying door edge. Because of the protective insulation, the tendency toward corrosive electro-chemical action is essentially eliminated in normal use.

Figure 7:
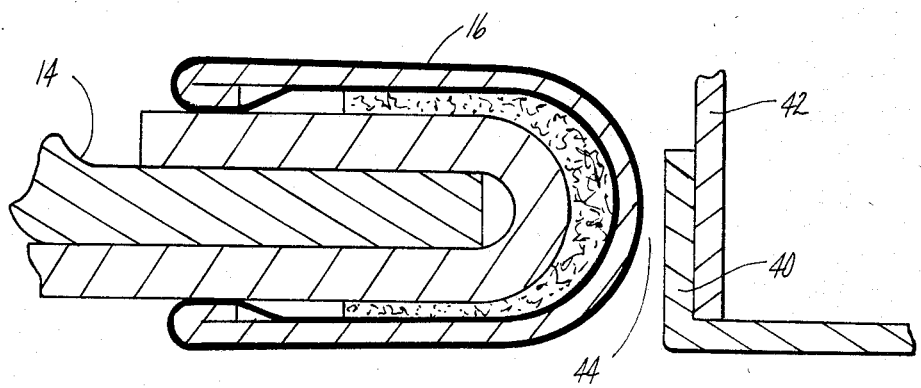
FIG. 7 is a horizontal cross sectional view on an enlarged scale taken in the direction of arrows 7—7 in FIG. 2.

FIG. 7 illustrates a condition wherein there is a different amount of overlap between the edge guard and the door edge and it illustrates how the design of a given edge guard cross section is adapted to handle gaps of different dimensions while still providing substantial concealment. By way of example, the lengths of the legs may be $\frac{1}{2}$ to $\frac{3}{4}''$.

In the case of certain four-door automobile designs, the hinging of the rear door is such that the forward edge of the rear door actually swings slightly forwardly when the door is opened. Hence where a door edge guard on the trailing edge of the front door is adjusted to the front edge of the rear door, as will be the case in certain four-door vehicles, it is necessary to allow for the effect of this slight forward motion of the forward edge of the rear door when the rear door is being opened. While it is of course possible to provide a greater thickness of shim when the front edge guard is being installed, which will be effective to allow for the forward swing of the front edge of the rear door, this will result in an increased thickness of the gap 44 than would be required for a two door automobile.

Figure 8:
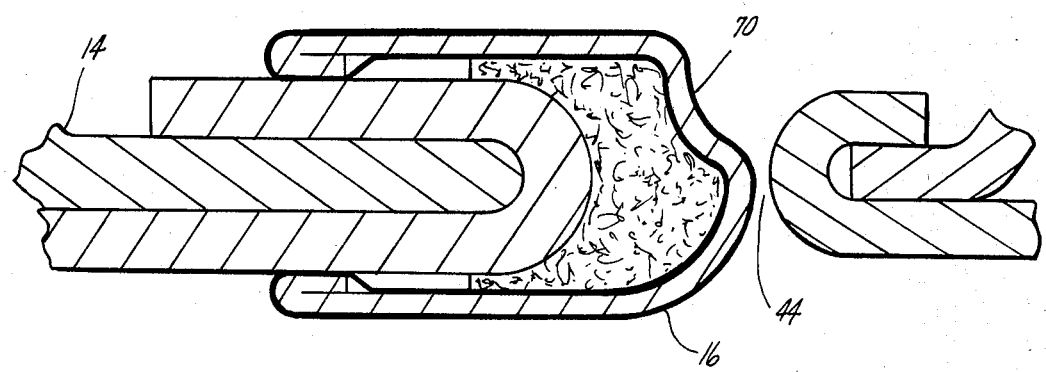
FIG. 8 is a horizontal sectional view on an enlarged scale taken in the direction of arrows 8—8 in FIG. 2.

A further refinement of the invention is shown in FIG. 8 wherein the edge guard channel is provided with a chamfer, or a recess, 70 running lengthwise of the edge guard and disposed on the inner half of the edge guard cross section as, for example, viewed in FIG. 8. The midpoint of the base of the edge guard channel may be the point at which the contact with the shim is established when the front door edge guard is being installed. When the rear door is swung open, the chamfer or recess 70 provides the necessary clearance for the slight forward swing of the front edge of the rear door. Thus this design has the advantage of providing the necessary clearance for the forward swing of the rear door when the door is open while at the same time providing a minimum thickness gap 44 when the front door is closed corresponding to that obtainable in a two door automobile.

Figure 9:
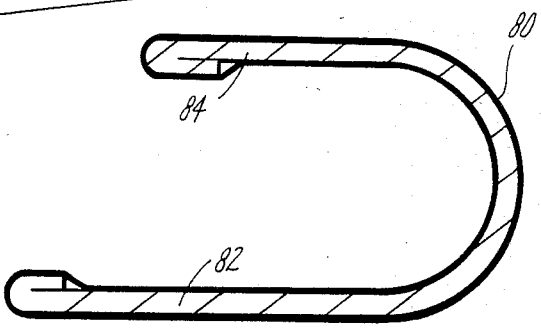
FIG. 9 is a cross sectional view similar to FIG. 4 illustrating an alternate construction.

A still further aspect of the invention is depicted by FIG. 9 which illustrates that the edge guard can have other than strictly a U-shape. This example illustrates a J-shaped edge guard 80 in which one leg 82 is longer than the other 84, in this case the outer leg being longer. This may be deemed a desirable alternative for certain usages and it is merely representative of the fact that the invention may be embodied in various cross sectional shapes.

Figure 10:
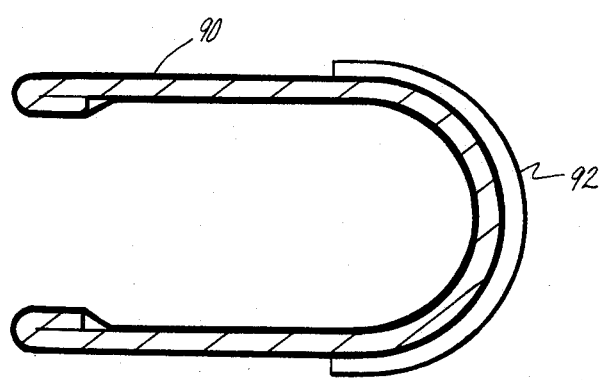
FIG. 10 is a cross sectional view similar to FIG. 9 illustrating still another construction.

FIG. 10 illustrates an advantageous way to establish the proper installed position of the edge guard without having to use a shim such as previously described. The edge guard 90 of FIG. 10 comprises a shim 92 incorporated as a part of the edge guard itself. The shim may be made a part of the edge guard during the edge guard manufacturing procedure or it may be subsequently applied to the manufactured edge guard. The edge guard is installed and adjusted in the manner described above but now with the base of the edge guard at shim 92 disposed to just contact the adjacent quarter panel and flange in the case of the two-door installation. Once the adjustment has been made, the door is opened and the release part is severed from the remainder of the edge guard. This will yield the gap 44 of the desired minimum thickness. The separation of the shim from the edge guard may take place either before or after the filler material has set.

While the invention has been described with reference to a self-retaining insulated metal type edge guard since such has particular advantages, it will be appreciated that principles of the invention may be practiced without use of this specific type of edge guard. For example, it is possible that a strictly non-metallic edge guard be used which is applied by means of adhesives. The adhesive itself as noted above could form the filler material and endow the construction with a certain limited resiliency whereby the edge guard, even if slightly deflected on the door edge, would nonetheless return to the desired position by virtue of the inherent memory of the elastic material.

Any suitable type of material may be used for insulation 48 and in this regard the vinyl plastics are at present deemed to be the most appropriate material. An especially good material for coloration and function is a laminate of polyvinylchloride (PVC) covered by polyvinylfluoride (PVF). The PVC bonds to the metal channel and the PVF provides the exterior coloration with the capability of providing many different colors each corresponding to that of a particular vehicle color.

By way of example the thickness of the door edge onto which the edge guard is installed may typically be on the order of ten to fifteen thousandths of an inch. In prior edge guards the legs are perhaps $\frac{1}{8}$ to $\frac{1}{4}$ of an inch long. With the present invention, the legs are extended considerably longer and may be on the order of $\frac{1}{2}$ to $\frac{3}{4}$ of an inch by way of example.

When the edge guard is manufactured by conventional manufacturing procedures, the longitudinal ends (i.e. top and bottom of the edge guard) may leave the metal channel exposed. If desired, the exposed metal may be covered either by applying a protective material which adheres onto and covers the longitudinal ends or by mounting an end cap at said ends with the end cap being suitably shaped to be received by the edge guard and to fit in cooperation with the door edge. The end cap may be of non-metallic material such as rubber, plastic or the like.

It is believed important to recognize the constraints which are imposed upon the manufacturer of a door edge guard. The thickness of the gap which exists between the trailing edge of a door and an adjacent part of the vehicle body such as a pillar post, is determined by the automobile manufacture, and in accordance with conventional automobile design manufacture, there are certain tolerances which are acceptable. An edge guard must satisfactorily fit on a door within these tolerances.

It must also be appreciated that the width of the gap is very small, typically fractions of an inch. The total thickness of the illustrated edge guard comprises the thickness of the metal, and the two thicknesses of insulation, one on the inside and the other on the outside. This total thickness of the edge guard must always be less than the minimum tolerable thickness of the door gap in case it is necessary for the edge guard to be fully inserted onto the door edge.

The purpose of the inner layer of insulation is to provide protection against galvanic action (i.e. rusting) between metal of the edge guard and metal of the door edge. It must also provide for the edge guard to be fitted onto the door edge without marring the painted edge. Hence, it is possible for this thickness to be relatively small. In other words, it is possible to make the thickness of the inner layer less than the thickness of the outer layer. A thicker outer layer is desirable for a number of reasons. For one, a thicker outer layer can provide improved protection not only to the edge guard and door edge on which the edge guard is installed, but it can also provide protection for an adjacent automobile which may be present in the path of the door swing. A thicker outer layer can attenuate the potential for damage when the door is opened and strikes an adjacent car. The increased thickness may have a tendency to cushion impact forces, and it may also provide greater resistance to exposure of the metal channel of the edge guard. If the outer layer of the edge guard is made relatively thin, impacts to which the edge guard is typically subjected over its useful life will have a tendency to cut and nick the outer insulation, creating "chisel marks", and with a reduced thickness, this can result in earlier exposure of the underlying metal of the edge guard. This exposure of metal can detract from the appearance. Hence, it is contemplated that an edge guard may be constructed with the outer layer thicker than the inner layer and one way of doing this is by an extrusion or co-extrusion process. It is of course however possible to use other methods of manufacture.

When the thicknesses of the insulating material are selected for a given minimum gap, this leaves a certain maximum thickness for the metal of the edge guard. Reducing the thickness of the edge guard metal can affect the self-retention characteristics. It is therefore desirable to use metal alloys which provide increased resiliency at the reduced thickness to provide enhanced self-retention forces. Moreover, the beads which are formed at the ends of the edge guard can be tightened to enhance the effectiveness of the self-retention action. In other words, the use of such alloys in reduced thickness material yields an enhanced gripping power, but the insulation on the interior of the edge guard still permits installation without paint scuffing or marring so that when the edge guard is in the installed position the insulating material on the interior of the edge guard inhibits galvanic action between the metal of the edge guard channel and the metal of the door edge. Although the invention may be practiced with different types of metal for the metal edge guard material, the present invention permits construction of the edge guard with an alloy, and it can eliminate the necessity of using a bi-metal. Bi-metal has heretofore been deemed desirable in certain edge guards but it does not have the resilience which may be required for edge guards used in small thickness door gaps. With the present invention the vinyl layer on the interior of a reduced thickness alloy channel provides for the installation and anti-galvanic characteristics of the edge guard and it eliminates the expense of having to use bi-metal and it is not hampered by the limited resilience of bi-metal. Moreover, the invention provides improvement and advantages over bi-metal regardless of which side of the bimetal is disposed on the interior.

A material which is suitable for the filler is commonly known as "bondo". This material is used in automotive body work, and it can be applied conveniently, permits adjustment of the edge guard, and it sets up relatively quickly thereafter.

The foregoing reference to use of a shim to set the gap between the edge guard and the pillar post should also preferably take into account deformation in the vehicle's body which occurs when the vehicle is in use. For example, when a vehicle is operating over the road, particularly a rough one, the body is subjected to substantial and varying forces. These forces can result in a certain twisting or deflection of the body parts which may not be readily noticeable but yet is nonetheless significant. Hence, the setting of the gap between the door edge guard and the adjacent pillar post should be sufficient to prevent the edge guard from hitting the pillar post under such conditions. Another condition which may give rise to twisting and deformation is when a tire is being changed and the vehicle is supported on only the front or rear wheels.

While the invention has been described in connection with a door panel it will be appreciated that the invention may be applied to any swinging closure in a vehicle in which the edge guard is applied to a trailing edge which closes against an adjacent portion of the vehicle body.

While a preferred embodiment of the invention has been disclosed, it will be appreciated that principles are applicable to other embodiments.

What is claimed is:

1. In combination with a vehicle having a swinging closure having a trailing edge which opens and closes against adjacent body structure of the vehicle such that in the closed position there exists a gap between said trailing edge and said adjacent body structure of the vehicle, an edge guard fitting onto said trailing edge and having a base and inner and outer legs extending from said base and disposed against opposite sides of said trailing edge, said edge guard having its legs of such lengths when viewed in cross section that the edge guard may be more fully or less fully positioned onto the edge over a range of adjustment positions corresponding to a range of thicknesses of said gap, said edge guard and said edge thereby cooperatively defining a variable volume space bounded by said edge, by said base, and by those portions of said legs immediately contiguous said base, and a filler material disposed in said space between said edge and the edge guard which allows the installation adjustment of the edge guard so that the edge guard can be positioned to substantially fill the gap when viewed from the exterior of the vehicle and which subsequently hardens to permanently define the final installed edge guard position wherein said base is spaced from the edge by the hardened filler occupying said space.

2. The combination called for in claim 1 including a shim provided on said edge guard, said shim being removable from the edge guard after the edge guard has been adjusted, the shim being used to abut with the adjacent body structure when the edge guard is being adjusted on the door edge.

3. The combination called for in claim 1, said edge guard including a chamfer, or recess, which in transverse cross section through the edge guard presents a concave shape on the exterior of the edge guard to provide clearance for a forwardly swinging forward edge of said adjacent body structure.

4. The combination called for in claim 1 including a shim provided between said base and said adjacent body structure of the vehicle for use in adjusting the edge guard on said edge to enable the base of the edge guard to be positioned in relation to said adjacent body structure a distance essentially equal to the thickness of the shim, and said shim being removable from between the edge guard and said adjacent body structure after the final adjustment position of the edge guard on the edge has been obtained.

5. The combination called for in claim 1, said edge guard including a camfer, or recess, which in transverse cross section through the edge guard imparts a concave shape to the exterior of the edge guard base adjacent the juncture of said base with said inner leg.

6. The combination called for in claim 1 in which the edge guard comprises a U-shaped metal channel forming the base and legs of the edge guard and providing a self-retention force whereby the legs press against the edge on opposite sides.

7. The combination called for in claim 6 in which the edge guard is encapsulated by plastic on both interior and exterior and the exterior color of the plastic matches the color of the swinging closure and the adjacent body structure of the vehicle.

8. The combination called for in claim 6 including insulating material disposed between the legs of the edge guard and the edge.

9. The combination called for in claim 8 in which said insulating material lines the entire interior of the edge guard and said filler material is disposed on the interior of the edge guard between the insulating material and the edge.

10. The combination called for in claim 6 including a colored plastic on the exterior of the edge guard, said colored plastic covering at least that portion of the edge guard which is visible from the exterior of the vehicle when the swinging closure is closed.

11. The combination called for in claim 10 in which the color of the plastic on the exterior of the edge guard matches the color of the swinging closure and adjacent body structure.

12. The combination called for in claim 11 in which the plastic comprises a composite film of polyvinylchloride and polyvinylfluoride, said polyvinylfluoride being disposed on the exterior to provide the coloration.

13. In combination with a vehicle having a swinging closure having a trailing edge which opens and closes against adjacent body structure of the vehicle such that there exists a gap between said trailing edge and said adjacent body structure of the vehicle, an edge guard fitting onto said trailing edge and having a base and inner and outer legs extending from said base and disposed against opposite sides of said trailing edge, said edge guard having its legs of such lengths when viewed in cross section that the edge guard may be more fully or less fully positioned onto the edge over a range of adjustment positions corresponding to a range of thicknesses of said gap thereby to cooperatively define a variable spacing distance between said base and said edge, and means to accurately locate the edge guard in a final installed position comprising a shim disposed on the exterior of said base and having a thickness to allow the base of the edge guard to be set a distance from said adjacent body structure essentially equal to the thickness of the shim when the swinging closure is in the closed position and said shim being removable from the edge guard after the final adjustment position of the edge guard on the edge has been obtained.

14. The combination set forth in claim 13 in which said base has in transverse cross section a generally semi-circular shape and said shim has a similar generally semi-circular shape and is removably secured to said base.

15. For use with a vehicle having a swinging closure having a trailing edge which opens and closes against adjacent body structure of the vehicle such that there exists a gap between the trailing edge and the adjacent body structure of the vehicle, an edge guard for fitting onto the trailing edge and having a base and inner and outer legs extending from said base for disposition against opposite sides of the trailing edge, said edge guard having its legs at such lengths when viewed in cross section that the edge guard is adapted to be more fully or less fully positioned onto the trailing edge over a range of adjustment positions corresponding to a range of thicknesses of the gap between the trailing edge and the adjacent body structure when the swinging closure is in the closed position, wherein said base comprises an exterior cross sectional shape which is convex from the proximal end of one of its legs substantially to the midpoint of the base and which is concave from the proximal end of the other of its legs essentially to the midpoint of the base.

* * * * *